United States Patent [19]

Burroway et al.

[11] Patent Number: 4,968,741

[45] Date of Patent: Nov. 6, 1990

[54] LATEX FOR COATINGS HAVING REDUCED BLUSHING CHARACTERISTICS

[75] Inventors: Gary L. Burroway, Doylestown; Albert M. Gesenhues, Cleveland Heights; Jennifer T. Braden, Stow, all of Ohio

[73] Assignee: The Goodyear Tire & Rubber Company, Akron, Ohio

[21] Appl. No.: 418,037

[22] Filed: Oct. 6, 1989

[51] Int. Cl.$^5$ .................................................. C08L 9/08
[52] U.S. Cl. ...................................... 524/710; 524/457
[58] Field of Search ................ 524/710, 458, 460, 457

[56] References Cited

U.S. PATENT DOCUMENTS

| | | | |
|---|---|---|---|
| 4,064,092 | 12/1977 | Burroway et al. | 260/29.6 PM |
| 4,097,440 | 6/1978 | Maximovich et al. | 260/31.4 R |
| 4,153,592 | 5/1979 | Burroway et al. | 260/29.6 N |
| 4,609,704 | 9/1986 | Hausman et al. | 524/710 |
| 4,794,139 | 12/1988 | Braden et al. | 524/555 |

*Primary Examiner*—Joseph L. Schofer
*Assistant Examiner*—Jeffrey T. Smith
*Attorney, Agent, or Firm*—Alvin T. Rockhill

[57] ABSTRACT

This invention relates to the synthesis of a latex which can be formulated into coatings having improved water resistance for both moisture vapor transmission and water spotting. Coatings which are formulated with the latex of this invention are particularly useful for coating metal substrates because they provide excellent rust and corrosion resistance. The subject invention more specifically discloses a process for producing a neutralized latex that is useful in the manufacture of water reducible coatings which comprises:

(1) free radical aqueous emulsion polymerizing at a pH of less than about 3.5 a monomer mixture which comprises, based on 100 weight percent monomers: (a) from about 45 to about 85 weight percent vinyl aromatic monomers, (b) from about 15 to about 50 weight percent of at least one alkyl acrylate monomer, and (c) from about 1 to about 6 weight percent of at least one unsaturated carbonyl compound; in the presence of about 0.5 to 4.0 phm at least one phosphate ester surfactant and in the presence of about 0.5 to 4.0 phm of at least one water insoluble nonionic surface active agent to produce a latex; and (2) neutralizing the latex with ammonia to a pH which is within the range of about 7 to about 10.5 to produce the neutralized latex.

24 Claims, No Drawings

LATEX FOR COATINGS HAVING REDUCED BLUSHING CHARACTERISTICS

BACKGROUND OF THE INVENTION

Most conventional coating resins are insoluble in water. Therefore, in general practice they have been dissolved in a suitable organic solvent or dispersed in water with the aid of an emulsifying agent or surfactant in order to provide a coating composition suitable for application to a substrate surface. A serious disadvantage of organic solvent solutions is that they are potentially toxic, flammable, and environmental pollutants.

Water reducible coatings do not present these problems and are, therefore, highly desirable. For this reason various water reducible coating resins, such as the one described in U.S. Pat. No. 4,474,926, have been developed. Water reducible coatings which utilize such resins have been developed for a variety of purposes and have been widely accepted in many applications such as highway striping paint.

There is a need for a coating for metal substrates which provide improved corrosion and rust resistance. Such coatings could be, for example, beneficially utilized in the automotive industry. It would be particularly desirable for such coatings to be of the water reducible type.

For purposes of this patent application, an aqueous coating system is considered to be a colloidal dispersion of a resin in water which can be reduced by the addition of water and which forms a durable coating when applied to a substrate surface. The term aqueous coating system is used herein interchangeably with the term water reducible coating. Other names which are sometimes applied to water reducible coatings are water born, water solubilized, and water dilutable.

SUMMARY OF THE INVENTION

In practicing the process of this invention water based coating resins can be prepared by free radical emulsion polymerization using a unique combination of surfactant, cosolvent, and monomeric ingredients. After the emulsion polymerization has been completed, it is important to neutralize the latex with ammonia to a pH which is within the range of about 7 to about 10. This combination results in a latex which can be formulated into coatings having improved water resistance for both moisture vapor transmission and water spotting. When applied to metal substrates, coating formulations made with the latex of this invention provide excellent corrosion resistance. Accordingly, formulations which are highly desirable as primers for metal surfaces can be made using this latex. Such coating formulations can also beneficially be employed in coating the undercarriages of motor vehicles.

This invention specifically reveals a process for producing a neutralized latex that is useful in the manufacture of water reducible coatings which comprises:

(1) free radical aqueous emulsion polymerizing at a pH of less than about 3.5 a monomer mixture which comprises, based on 100 weight percent monomers: (a) from about 45 to about 85 weight percent vinyl aromatic monomers, (b) from about 15 to about 50 weight percent of at least one alkyl acrylate monomer, and (c) from about 1 to about 6 weight percent of at least one unsaturated carbonyl compound: in the presence of about 0.5 to 4.0 phm of at least one phosphate ester surfactant and in the presence of about 0.5 to 4.0 phm of at least one water insoluble nonionic surface active agent to produce a latex: and (2) neutralizing the latex with ammonia to a pH which is within the range of about 7 to about 10.5 to produce the neutralized latex.

In carrying out the process of this invention, monomeric ingredients can be fed into the reaction media continuously throughout the course of the polymerization reaction to produce a more uniform composition and to avoid the formation of water soluble block copolymers of the carboxylic acid group containing monomers. The surfactant combination found most useful in the practice of this invention is comprised of a partially neutralized salt of an alkyl phosphate ester together with a long chain fatty alcohol which contains from 8 to 22 carbon atoms.

DETAILED DESCRIPTION OF THE INVENTION

The latices of this invention are prepared by free radical emulsion polymerization. The charge compositions used in the preparation of the latices of this invention contain monomers, at least one phosphate ester surfactant, at least one water insoluble nonionic surface active agent and at least one free radical initiator. The monomer charge composition used in such polymerizations is comprised of (a) from about 45 to about 85 weight percent vinyl aromatic monomers, (b) from about 15 to about 50 weight percent of at least one alkyl acrylate monomer, and (c) from about 1 to about 6 weight percent of at least one unsaturated carbonyl compound. It is preferred for the polymer being synthesized to be comprised of from about 60 to about 80 weight percent vinyl aromatic monomers, from about 20 to about 40 weight percent alkyl acrylate monomers, and from about 1.5 to about 5 weight percent unsaturated carbonyl compounds. It is more preferred for the polymer to be comprised of from about 65 weight percent to 75 weight percent vinyl aromatic monomers, from about 22 to about 30 weight percent alkyl acrylate monomers, and from about 2 to about 4 weight percent unsaturated carbonyl compounds.

Some representative examples of vinyl aromatic monomers which can be used include styrene, alpha-methyl styrene, and vinyl toluene. Styrene and alpha-methyl styrene are the preferred vinyl aromatic monomers. Due to its relatively low cost styrene is the most preferred vinyl aromatic monomer. The alkyl acrylate monomers which can be employed have alkyl moieties which contain from 2 to about 10 carbon atoms. The alkyl acrylate monomer will preferably have an alkyl moiety which contains from 3 to 5 carbon atoms. Normal butyl acrylate is a highly preferred alkyl acrylate monomer. Some representative examples of unsaturated carbonyl compounds which can be utilized include acrylic acid, methacrylic acid, fumaric acid, itaconic acid, maleic acid, and maleic anhydride. The preferred unsaturated carbonyl compounds include acrylic acid, methacrylic acid, fumaric acid, and itaconic acid. Acrylic acid and methacrylic acid are the most preferred unsaturated carbonyl compounds. In most cases, it is advantageous to use a combination of both acrylic acid and methacrylic acid as the unsaturated carbonyl compound component used in making the latex. For instance, the utilization of about 1 to about 3 weight percent acrylic acid with about 0.5 to about 1.5 weight percent methacrylic acid results in the latex having improved freeze-thaw stability. For example, the utilization of about 2% acrylic acid with 1% methacrylic acid as the unsaturated carbonyl compound component results in the latex produced being capable of withstanding more than five (5) freeze-thaw cycles. It is important for latices which are shipped through cold regions of the world to have this improved freeze-thaw stability.

The charge composition used in the preparation of the latices of this invention will contain a substantial quantity of water. The ratio between the total amount of monomers present in the charge composition and water can range between about 0.2:1 and about 1.2:1. It is generally preferred for the ratio of monomers to water in the charge composition to be within the range of about 0.8:1 and about 1.1:1. For instance, it is very satisfactory to utilize a ratio of monomers to water in the charge composition of about 1:1.

The charge composition will also contain from about 0.5 phm (parts per hundred parts of monomer) to about 4.0 phm of at least one phosphate ester surfactant. It is normally preferred for the phosphate-ester surfactant to be present in the polymerization medium at a level within the range of about 1 phm to about 3.5 phm. It is generally more preferred for the charge composition to contain from about 2 to about 3 phm of the phosphate ester surfactant.

The phosphate ester surfactants that are useful in this invention are commercially available from a wide variety of sources. For instance, GAF Corporation sells phosphate ester surfactants under the tradename of Gafac ™ RE-410, Gaftax ™ CD-169, and Gaftax ™ DP-100 Some other phosphate-ester surfactants that are commercially available include Indoil ™ (BASF Wyandotte Corporation), Emphos ™ (Witco Chemical Corporation), Cyclophos ™ (Cyclochemicals Corporation), Tryfac ™ (Emery Industries), and Alcamet ™ (Lonza, Inc.).

The phosphate ester surfactants used in the process of this invention can have the structural formula:

$$\begin{array}{c} O \\ \parallel \\ R-O-P-OH \\ | \\ OH \end{array}$$

wherein R is an alkyl group or an aryl group. As a general rule, R will contain from about 4 to about 40 carbon atoms. It is preferred for such phosphate ester surfactants to be in the form of partially neutralized salts. Monobasic salts and nonionic compounds can be utilized as well as such dibasic salts. For example, Gafac ™ RE-410, which is a preferred phosphate ester surfactant, is a complex mixture of (1) a dibasic salt having the structural formula:

$$\begin{array}{c} O \\ \parallel \\ RO(CH_2CH_2O)_{\overline{n}}P-O^{\ominus}M^{\oplus} \\ | \\ O^{\ominus}M^{\oplus} \end{array}$$

(2) a monobasic salt having the structural formula

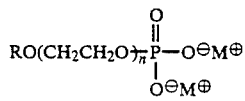

and (3) a nonionic compound having the structural formula:

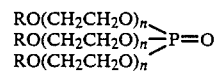

In the case of Gafac ™ RE-410, n is 4, and R represents nonyl phenol.

The charge composition used in the preparation of the latices of this invention also contains from about 0.5 phm to about 4 phm of at least one water insoluble nonionic surface active agent. The water insoluble nonionic surface active agent will preferably be present in the polymerization medium at a level within the range of about 1 phm to about 3.5 phm and will more preferably be present in an amount ranging from about 2 phm to about 3 phm. The water insoluble nonionic surface active agent will normally be a fatty alcohol or a nonionic surfactant.

The fatty alcohol utilized will typically be of the structural formula R—OH wherein R represents an alkyl group containing from 5 to 22 carbon atoms. In most cases, R will be an alkyl group containing from 10 to 18 carbon atoms. It is generally preferred for the fatty alcohol to contain from 12 to 14 carbon atoms. For instance, lauryl alcohol is a particularly preferred fatty alcohol.

The nonionic surfactants which can be utilized as the water insoluble nonionic surface active agent will normally have a hydrophile-lipophile balance (HLB) number of less than about 12. It is generally preferred for such nonionic surfactants to have a HLB number of less than about 10. HLB numbers are indicative of a surfactant's emulsification behavior and relate to the balance between the hydrophilic and lipophilic (hydrophobic) portions of the molecule. HLB numbers are further described in Griffin, W. C., J. Soc. Cosmet. Chem. 1, 311 (1949) which is incorporated herein by reference. The HLB number of a given surfactant generally decreases with increasing temperatures. The HLB numbers referred to herein are determined or calculated for the reaction temperature employed. Water insoluble nonionic surfactants which contain low levels (from 1 to about 8) ethylene oxide repeat units can be employed. These water insoluble nonionic surfactants can have the structural formula:

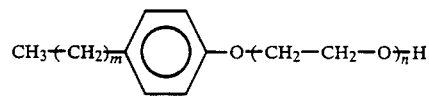

wherein n is an integer from 1 to about 8 and wherein m is an integer from about 6 to about 12. It is normally preferred for m to be 8 or 9. The HLB number of such compounds increases with increasing levels of ethylene oxide incorporation. The HLB number of such compounds increases as a function of n as follows:

| n | HLB Number |
|---|---|
| 1 | 3.6 |
| 3 | 7.8 |
| 4 | 10.4 |
| 10 | 13.5 |
| 16 | 15.8 |
| 30 | 17.3 |

| n | HLB Number |
|---|---|
| 40 | 17.9 |

Polyols which are copolymers of ethylene oxide and propylene oxide can also be employed as the water insoluble nonionic surfactant. Such polyols have the structural formula:

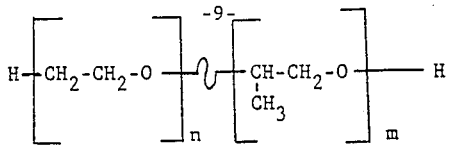

wherein n and m are integers, wherein the ratio of m to n is at least about 5:1, and wherein-?-indicates that the distribution of monomeric be random. The polyols which can be used also have molecular weights of at least about 1500. The polyols which are preferred contain less than about 10% bound ethylene oxide (have a ratio of m to n of at least about 10:1).

The use of larger amounts of phosphate ester surfactants in the polymerization medium leads to better latex stability. However, the utilization of larger amounts of phosphate ester surfactants also leads to greater blushing in the ultimate coating and consequently less rust and corrosion resistance. The utilization of greater amounts of the water insoluble nonionic surface active agent leads to less latex stability, but also results in less blushing and more water resistance (less water permeability). Accordingly, it is important to balance the amounts of phosphate ester surfactant and fatty alcohol utilized in the charge composition.

The free radical aqueous emulsion polymerizations used in preparing the latices of this invention are initiated with at least one free radical generator. The free radical generator is normally employed at a concentration within the range of about 0.01 phm to about 1 phm. The free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutylronitrile, 2-t-butylazo-1-cyanocyclohexane, 1-t-amylazo-1-cyanocyclohexane, and the like, the various alkyl perketals, such as 2,2-bis-(t-butyl-peroxy)butane, and the like. Water soluble peroxygen free radical initiators are especially useful in such aqueous polymerizations.

The emulsion polymerizations of this invention are typically carried out at the temperature ranging between about 125° F (52° C) and 190° F (88° C). At temperatures above about 88° C alkyl acrylate monomers, such as butyl acrylate, have a tendency to boil. Thus, a pressurized jacket would be required for heating such alkyl acrylate monomers to temperatures in excess of about 88° C. On the other hand, the polymerization reaction proceeds at a very slow rate at temperatures below about 52° C. The slow rate of polymerization experienced at temperatures below about 52° C results in the polymer having a nonuniform distribution of repeat units in its backbone. The slow rates of polymerization experienced at such low temperatures are also undesirable because they greatly reduce the throughput of the polymerization reactor.

It is generally preferred for the polymerization temperature to be maintained within the range of about 150° F (66° C) to 180° F (82° C). It is generally more preferred for the reaction temperature to be controlled within the range of about 160° F (71° C.) to about 170° F (77° C.). It is important for the polymerization to be conducted at a pH which is below about 3.5 so that a water sensitive polymer is not produced. It is preferred for the pH of the polymerization medium to be maintained at a level of about 3.0 or less throughout the polymerization. As the polymerization proceeds, the pH of the polymerization medium will drop naturally. Thus, good results can be attained by adjusting the pH of the initial monomer charge composition to within the range of about 3.0 to about 3.5 and allowing the polymerization to proceed. In such a case the final pH of the polymerization medium will be about 1.5 which is highly satisfactory.

In commercial operations it is typically desirable to add about 15% to about 25% of the monomers in an initial charge. The initial charge is then allowed to react for a period of about 30 minutes to about 60 minutes. Then the balance of the monomers to be charged can be continuously charged into the reaction zone at a rate which is sufficient to maintain a reaction temperature within the desired temperature range. By continuously adding the monomers to the reaction medium while maintaining a relatively constant reaction temperature, very uniform polymers can be prepared.

In accordance with the process of this invention the latex synthesized is then neutralized with ammonia to a pH within the range of about 7 to about 10.5. It is normally preferred for the latex to be neutralized to a pH within the range of 8 to 10 and more preferred for the latex to be neutralized to a pH within the range of about 9.0 to about 9.5. This can be accomplished by simply dispersing ammonia throughout the latex to produce neutralized latex.

The latex formed can be diluted with additional water to the concentration (solids content) that is desired. This latex can be used in the preparation of water reducible coatings using techniques well-known to those skilled in the art. Generally, various pigments and plasticizers are added to the latex in the preparation of the water reducible coating. Such a latex can also be coagulated and dried using techniques well-known to those skilled in the art. The dry resin produced can then be used in the manufacture of water reducible coatings if it is preferable to use a dry resin. Poor adhesion is a problem that is sometimes encountered with water reducible resins. The adhesion of coatings made with water reducible resins to substrates can be greatly improved by the addition of a plasticizer.

A film forming, water reducible composition can be prepared utilizing a mixture of the resin with suitable coalescing solvent and plasticizer. It is preferred for the coalescing solvent to be at least water miscible and even more preferably for it to be water soluble. Of the various solvents which can be used, generally the ethylene glycol monobutyl ether, ethylene glycol monoethyl ether, diethylene glycol monomethyl ether, diethylene glycol monoethyl ether and diethylene glycol monobutyl ether are preferred. It should be noted that the solvent and plasticizer can be mixed directly with the resin in its water emulsion or latex without its normal recovery in its dried form, in most instances, if desired. In such an operation, the composite would automatically be in a water reduced form, when sufficient ammonia is used.

Of the various plasticizers, it is desired that one be selected which is liquid at room temperature such as 25° C. and have a sufficiently high boiling point, preferably at least 100° C, and even more preferably, at least 150° C., so that they do not volatilize from the coating composition when applied to a substrate. Indeed, the plasticizer should enhance the water insolubility of a dried coating of the coalesced resin. Further, the plasticizer, or mixture of plasticizers, must be characterized by being compatible with the resin itself. For this characterization, a solubility parameter in the range of about 8 to about 16 is required. Such solubility parameter is of the type described in The Encyclopedia of Polymer Science and Technology, Volume 3, Page 854, 1965, John Wiley and Sons, Inc., which is simply determined by the equation $$\delta = (\Sigma F)/V = F/MW/d$$

where $\delta$ = solubility parameter
F = sum of the pertinent molar attraction constants of groups determined by Small, P A [(J Appl Chem 3, 71, (1953)]
V = Molar volume at 25° C.
MW = molecular weight
d = density at 25° C.

Various plasticizers can be used for this purpose. They can, for example, be of the type listed in the Federation Series on Coatings Technology, Unit Twenty-two, entitled "Plasticizers," published Apr., 1974, so long as they fulfill the melting point, boiling point and compatibility requirements.

Representative of various plasticizers are cyclic plasticizers such as phosphoric acid esters, phthalic anhydride esters and trimellitic acid esters as well as N-cyclohexyl-p-toluene sulfonamide, dibenzyl sebacate, diethylene glycol dibenzoate, di-t-octylphenylether, dipropane diol dibenzoate, N-ethyl-p-toluene sulfonamide, isopropylidenediphenoxypropanol, alkylated naphthalene, polyethylene glycol dibenzoate, o-p-toluene sulfonamide, trimethylpentanediol dibenzoate and trimethylpentanediol monoisobutyrate monobenzoate.

Representative of various acyclic plasticizers are adipic acid esters, azelaic acid esters, citric acid esters, acetylcitric acid esters, myristic acid esters, phosphoric acid esters, ricinoleic acid esters, acetylricinoleic acid esters, sebacic acid esters, stearic acid esters, epoxidized esters, as well as 1,4-butane diol dicaprylate, butoxyethyl pelargonate di[(butoxyethoxy)ethoxy] methane, dibutyl tartrate, diethylene glycol dipelargonate, diisooctyl diglycolate, isodecyl nonanoate, tetraethylene glycol di(2-ethylbutyrate), triethylene glycol di(2-ethylhexanoate), triethylene glycol dipelargonate and 2,2,4-trimethyl-1,3-pentane diol diisobutyrate.

Additional various plasticizers, cyclic, acyclic, and otherwise, include chlorinated paraffins, hydrogenated terphenyls, substituted phenols, propylene glycols, polypropylene glycol esters, polyethylene glycol esters, melamines, epoxidized soys, oils, melamines, liquid, hydrogenated abietate esters, epoxytallate esters, alkyl phthalyl alkyl glycolates, sulfonamides, sebacate esters, aromatic epoxies, aliphatic epoxies, liquid poly($\alpha$-methyl styrene), maleate esters, mellitate esters, benzoates, benzyl esters, tartrates, succinates, isophthalates, orthophthalates, butyrates, fumarates, glutarates, dicaprylates, dibenzoates and dibenzyl esters. It is to be appreciated that relatively low molecular weight polymers and copolymers derived from monoolefins containing 4 to 6 carbon atoms, mixtures of diolefins and monoolefins containing 4 to 6 carbon atoms as well as such hydrocarbons and hydrocarbon mixtures with styrene and/or $\alpha$-methyl styrene can also be used.

The preferred esters are prepared from the reaction of carboxylic and dicarboxylic acids including fatty acids, such as the phthalic acids, benzoic acid, dibenzoic acid, adipic acid, sebacic acid, stearic acid, maleic acid, tartaric acid, succinic acid, butyric acid, fumaric acid and glutaric acid with hydrocarbon diols, preferably saturated hydrocarbon diols, having about 7 to 13 carbon atoms.

Representative of various phosphoric acid esters are cresyl diphenyl phosphate, tricresyl phosphate, dibutyl phenyl phosphate, diphenyl octyl phosphate, methyl diphenyl phosphate, tributyl phosphate, triphenyl phosphate, tri(2-butoxyethyl) phosphate, tri(2-chloroethyl) phosphate, tri-2(chloropropyl) phosphate and trioctyl phosphate.

Representative of various phthalic anhydride esters are butyl octyl phthalate, butyl 2-ethylhexyl phthalate, butyl n-octyl phthalate, dibutyl phthalate, diethyl phthalate, diisodecyl phthalate, dimethyl phthalate dioctyl phthalates, di(2-ethylhexyl) phthalate, diiso-octyl phthalate, di-tridecyl phthalate, n-hexyl n-decyl phthalate, n-octyl n-decyl phthalate, alkyl benzyl phthalate, bis(4-methyl-1,2-pentyl) phthalate, butyl benzyl phthalate, butyl cyclohexyl phthalate, di(2-butoxyethyl) phthalate, dicyclohexyl isodecyl phthalate, dicyclohexyl phthalate, diethyl isophthalate, di n-heptyl phthalate, dihexyl phthalate, diisononyl phthalate, di(2-methoxyethyl) phthalate, dimethyl isophthalate, dinonyl phthalate, dioctyl phthalates, dicapryl phthalate, di(2-ethylhexyl) isophthalate, mixed dioctyl phthalates, diphenyl phthalate, 2-(ethylhexyl) isobutyl phthalate, butyl phthalyl butyl glycolate, ethyl (and methyl) phthalyl ethyl glycolate, polypropylene glycol bis(amyl) phthalate, hexyl isodecyl phthalate, isodecyl tridecyl phthalate and iso-octyl isodecyl phthalate.

Representative of trimellitic acid esters are triisooctyl trimellitate, tri-n-octyl n-decyl trimellitate, trioctyl trimellitate, tri(2-ethylhexyl) trimellitate, tri-n-hexyl n-decyl trimellitate, tri-n-hexyl trimellitate, triisodecyl trimellitate and triisononyl trimellitate.

Representative of various adipic acid esters are di[2-(2-butoxyethoxy) ethyl]adipate, di(2-ethylhexyl) adipate, diisodecyl adipate, dioctyl adipates (including diisooctyl adipate) n-hexyl n-decyl adipate, n-octyl n-decyl adipate, and di-n-heptyl adipate.

Representative examples of sebacic acid esters are dibutyl sebacate, di(2-ethylhexyl) sebacate, dibutoxyethyl sebacate, diiso-octyl sebacate and diisopropyl sebacate.

Representative examples of azelaic acid esters are di(2-ethylhexyl) acelate dicyclohexyl acelate, diisobutyl azelate and diiso-octyl azelate.

In the practice of this invention, the water reducible composition of resin, plasticizer and coalescing solvent, if used, is water reduced by neutralizing the carboxyl groups of the resin with ammonia and mixing with water. The resulting dispersion or solution can generally be characterized by being stable without appreciable, if any, precipitation of the resin for a period of at least thirty (30) days and preferably for a period of at least 365 days or more at about 25° C.

Generally, for the purpose of this invention about 100 to about 400 parts by weight water are used per 100 parts by weight neutralized resin, although more or less water can usually be used depending on whether a high or low viscosity dispersion or solution is desired or whether a high or low solids content is desired. It also depends on the type and amount of coalescing solvent and plasticizer used. The water reduced coating composition, as an aqueous dispersion or solution, is applied as a coating onto a suitable substrate such as wood, masonry, various plastics and various metals. The water, ammonia, and coalescing solvent are evaporated from the coating, usually at a temperature in the range of about 20° C to about 100° C., preferably about 25° C to about 50° C to leave a substantially water insoluble coating of the coalesced resin and plasticizer. Generally such a coating can be prepared and applied without the need for additional hardening agents or curatives to decrease the water sensitivity.

Therefore, it is an important feature of this invention that a durable coating is formed on a substrate through the preparation of a particular resin having balanced hydrophilic and hydrophobic elements, preferably with a further balance of hard and soft segments, and the formation of a water reduced composition of such resin with a combination of coalescing solvent and compatible plasticizer.

The practice of the invention is more fully illustrated by reference to the following examples which are intended to be illustrative rather than limiting of the scope of the invention. All parts are by weight unless otherwise indicated.

EXAMPLE 1

In this experiment, a latex was prepared in a ten gallon (37.8 liter) reactor using the technique of this invention. The reactor utilized in this experiment was equipped with baffles for agitation and was operated at 150 rpm (revolutions per minute). A buffer solution, an initiator solution, and a monomer solution were made for utilization in the polymerization. The buffer solution was made by mixing 15.6 kilograms of water with 340 grams of the sodium salt of an alkyl phosphate ester having a pH of about 3 and 340 grams of dodecanol. The initiator solution was prepared by mixing 1.36 kilograms of water and 68 grams of ammonium persulfate. The monomer solution was prepared by mixing 9.66 kilograms of styrene, 27 grams of t-dodecyl mercaptan, 3.54 kilograms of n-butylacrylate, 272 grams of acrylic acid and 136 grams of methacrylic acid.

After the reactor had been evacuated for 30 minutes, the buffer solution was charged into the reactor. Then 20% of the monomer solution was charged into the reactor. The reactor was heated to a temperature of 165° F. (74° C.) and one-half of the initiator solution was added to the reactor. After about 30 minutes of polymerization the continuous addition of the remaining monomer solution was started. The additional monomer solution was added over a period of about three hours at a rate which was sufficient to maintain a temperature of about 165° F (74° C) in the reactor. The remainder of the initiator solution was charged into the reactor after about two hours of polymerization time.

The latex made utilizing this procedure had a solids content of 46.0, a pH of 1.88, a Brookfield viscosity of 583 centipoise, and had a coagulum level of 115 grams. The pH of the latex made was adjusted to 9.5 by the addition of ammonium hydroxide.

A clear coating composition was made by mixing 565 pounds (256 kg) of the latex with 75 pounds (34 kg) of ethylene glycol n-butyl ether, 161 pounds (73 kg) of water, 5 pounds (2.3 kg) of an antifoaming agent, 5 pounds (2.3 kg) of a wetting agent, 26 pounds (12 kg) of butyl benzyl phthalate, and 3 pounds (1.4 kg) of a 28% aqueous ammonium hydroxide solution. The clear coating composition made was then applied to steel test panels (type R Q-Panels) with a film casting knife having a clearance of 0.003 inch (0.07 m). The coating composition was allowed to dry with the resultant coating having a thickness of about 0.001 inch (0.025 mm).

The coated panel made was then evaluated and compared with 28 commercial coating compositions. The commercial coating compositions were formulated following the manufacturers' recommendations and applied to the steel test panels. The coated test panels were then evaluated in a salt spray test chamber and in a humidity chamber. In the salt spray test the test panels were sprayed with a 5% aqueous sodium chloride solution and maintained at a temperature of 100° F. (38° C.) according to ASTM-B117. In the humidity chamber, the test panels were maintained at a temperature of 100° F (38° C) and a relative humidity of 100%.

Before testing in the humidity chamber and in the salt spray chamber, the coatings on the test panels were scratched with a razor blade. The coating made utilizing the latex of this invention passed both the salt spray test and the humidity test. No rust formed after 300 hours of salt spray testing or 400 hours of humidity testing except, of course, on the scratch.

The results of the testing of the 28 commercial coating compositions are summarized in Table I.

TABLE I

| Tradename | Manufacturer | Results and Hours to Failure | |
|---|---|---|---|
| | | Salt Spray | Humidity |
| Arolon 820 | (NL) | Pass | Fail 400 |
| Arolon 840 | (NL) | Fail 100 | Fail 400 |
| Aquamac 640 | (McWhorter) | Fail 100 | Fail 400 |
| Neocryl XA-6037 | (ICI) | Fail 100 | Fail 400 |
| UCAR 4358 | (Union Carbide) | Fail 100 | Fail 400 |
| Arolon 860 | (NL) | Fail 100 | Fail 400 |
| Arolon 845 | (NL) | Pass | Fail 400 |
| Joncryl 537 | (Johnson Wax) | Fail 24 | Fail 400 |
| Joncryl 538 | (Johnson Wax) | Fail 24 | Fail 400 |
| Joncryl 530 | (Johnson Wax) | Fail 24 | Fail 400 |
| Res 1018 | (Unocal) | Fail 100 | Fail 400 |
| Synthemul 40-422 | (Reichhold) | Fail 100 | Fail 400 |
| Synthemul 97-8550 | (Reichhold) | Fail 100 | Fail 400 |
| UCAR 443 | (Union Carbide) | Fail 100 | Fail 400 |
| WL-51 | (Rohm & Haas) | Fail 100 | Fail 400 |
| WL-71 | (Rohm & Haas) | Fail 100 | Fail 400 |
| WL-81 | (Rohm & Haas) | Fail 100 | Fail 400 |
| WL-91 | (Rohm & Haas) | Fail 100 | Fail 400 |
| WL-92 | (Rohm & Haas) | Fail 100 | Fail 400 |
| WL-96 | (Rohm & Haas) | Fail 100 | Fail 400 |
| MV-23 | (Rohm & Haas) | Fail 24 | Pass |
| Pliolite WR-D | (Goodyear) | Fail 24 | Pass |
| Neocryl A-633 | (ICI) | Fail 100 | Fail 400 |
| Neocryl A-645 | (ICI) | Fail 100 | Fail 400 |
| Neocryl A-621 | (ICI) | Fail 100 | Fail 400 |
| Neocryl A-622 | (ICI) | Fail 100 | Fail 400 |
| HG-74 | (Rohm & Haas) | Fail 100 | Fail 400 |
| HG-54 | (Rohm & Haas) | Fail 100 | Fail 400 |

In cases where the coatings failed, the entire surface of the test panel was covered with rust. As can be seen, none of the 28 commercial coating compositions tested passed both tests.

The latex of this invention provides excellent rust and corrosion resistance for steel coatings. This is because it can be used in making coatings which provide outstanding moisture barrier characteristics. Such coatings also provide excellent resistance to carbon dioxide permeability. This makes such coatings an excellent choice for coating steel reinforced concrete.

Coatings made with the latex of this invention also have outstanding properties for coating aluminum, other metals and plastics. The latex of this invention can further be used in making varnish for wooden articles. In fact, coatings made with the latex of this invention have a good combination of properties for coating a wide variety of substrates. However, paints made with the latex of this invention are not recommended for coating the exterior of wood buildings since such coatings do not "breath" appreciably. Such coatings offer high degree of chemical resistance to concentrated alkali, dilute alkali, dilute acid and most organic and inorganic oils. The coatings of this invention also provide a high level of resistance to ultra-violet light and retain good gloss after exposure to ultra-violet light and moisture. Additionally, the coatings of this invention are hard and tough.

The water resistance of coatings made with the coating compositions of this invention can be improved by treating the coating composition with a carbodiimide. UCARLNK ™ Crosslinker XL-25SE from Union Carbide is a multifunctional carbodiim+de that is well suited for this purpose. By utilizing such carbodiimides, water spotting and blushing can be virtually eliminated. As a general rule, the carbodiimide is added to the latex or coating composition in an amount which is within the range of about 10 phr to about 20 phr.

While certain representative embodiments and details have been shown for the purpose of illustrating the invention, it will be apparent to those skilled in this art hat various charges and modifications may be made therein without departing from the scope of the invention.

What is claimed is:

1. A process for producing a neutralized latex that is useful in the manufacture of water reducible coatings which comprises:
    (1) free radical aqueous emulsion polymerizing at a pH of less than about 3.5 a monomer mixture which comprises, based on 100 weight percent monomers: (a) from about 45 to about 85 weight percent vinyl aromatic monomers, (b) from about 15 to about 50 weight percent of at least one alkyl acrylate monomer, and (c) from about 1 to about 6 weight percent of at least one unsaturated carbonyl compound; in the present of about 0.5 to 4.0 phm at least one phosphate ester surfactant and in the presence of abut 0.5 to 4.0 phm of at least one water insoluble nonionic surface active agent selected from the group consisting of nonionic surfactants having a HLB number of less than about 12, fatty alcohols having the structural formula R—OH wherein R represents an alkyl group containing from 5 to 22 carbon atoms, and polyols which are copolymers of ethylene oxide and propylene oxide to produce a latex; and
    (2) neutralizing the latex with ammonia to a pH which is within the range of about 7 to about 10.5 to produce the neutralized latex.

2. The neutralized latex made by the process specified in claim 1.

3. A water reducible coating composition made utilizing the neutralized latex specified in claim 2.

4. A process as specified in claim 1 wherein the monomer mixture is comprised of (a) from about 60 to about 80 weight percent vinyl aromatic monomers, (b) from about 20 to about 40 weight percent of at least one alkyl acrylate monomer, and (c) from about 1.5 to about 5 weight percent of at least one saturated carbonyl compound, said percentages being based on total monomers.

5. A process as specified in claim 4 wherein said free radical aqueous emulsion polymerization is conducted at a temperature within the range of about 52° C. to about 88° C.

6. A process as specified in claim 4 wherein the vinyl aromatic monomer is styrene.

7. A process as specified in claim 6 wherein the alkyl acrylate monomer is n-butyl acrylate.

8. A process as specified in claim 7 wherein a combination of acrylic acid and methacrylic acid is utilized as the unsaturated carbonyl compound.

9. A process as specified in claim 1 wherein the monomer mixture is comprised of (a) from about 65 to about 75 weight percent styrene, (b) from about 22 to about 30 weight percent n-butylacrylate, (c) from about 1 to about 3 weight percent acrylic acid, and (d) from about 0.5 to about 1.5 weight percent methacrylic acid.

10. A process as specified in claim 9 wherein the free radical aqueous emulsion polymerization is conducted at a temperature within the range of about 52° C. to about 88° C.

11. A process as specified in claim 7 wherein the water insoluble surface agent is a fatty alcohol and wherein the fatty alcohol contains from about 10 to about 18 carbon atoms.

12. A process as specified in claim 9 wherein the water insoluble surface agent is a fatty alcohol and wherein the fatty alcohol contains from about 12 to about 14 carbon atoms.

13. A process as specified in claim 11 wherein the water insoluble surface agent is a fatty alcohol and wherein the fatty alcohol is present at a level within the range of about 1 to about 3.5 phm and wherein the phosphate ester surfactant is present at a level within the range of about 1 to about 3.5 phm.

14. A process as specified in claim 7 wherein the water insoluble surface agent is a fatty alcohol and wherein the fatty alcohol is present at a level within the range of about 2 to about 3 phm and wherein the phosphate ester surfactant is present at a level within the range of about 2 to about 3 phm.

15. A process as specified in claim 1 wherein the water insoluble surface agent is a fatty alcohol.

16. A process as specified in claim 1 wherein said polymerization is conducted at a pH of less than about 3.0.

17. A process as specified in claim 1 wherein said water insoluble nonionic surface active agent is a water insoluble nonionic surfactant having the structural formula:

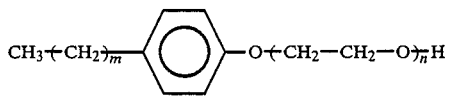

wherein n is an integer from 1 to about 8 and wherein m is an integer from about 6 to about 12.

18. A process as specified in claim 17 wherein m is 8.

19. A process as specified in claim 17 wherein m is 9.

20. A process as specified in claim 17 wherein said water insoluble nonionic surface active agent is a polyol.

21. A process as specified in claim 20 wherein said polyol has a molecular weight of at least about 1500.

22. A process as specified in claim 21 wherein said polyol contains less than about 20% bound ethylene oxide.

23. A process as specified in claim 21 wherein said polyol contains less than about 10% bound ethylene oxide.

24. A process as specified in claim 15 wherein said fatty alcohol is lauryl alcohol.

* * * * *